United States Patent
Hirschmann

(10) Patent No.: US 11,773,909 B2
(45) Date of Patent: Oct. 3, 2023

(54) METHOD AND APPARATUS OF ASSEMBLING ONE OR MORE BEARINGS

(71) Applicant: Michael Hirschmann, Altdorf (DE)

(72) Inventor: Michael Hirschmann, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 119 days.

(21) Appl. No.: 17/381,158

(22) Filed: Jul. 20, 2021

(65) Prior Publication Data

US 2022/0025933 A1   Jan. 27, 2022

(30) Foreign Application Priority Data

Jul. 21, 2020   (EP) ..................... 20186984

(51) Int. Cl.
*F16C 43/04* (2006.01)
*F16C 33/58* (2006.01)
*B23P 15/00* (2006.01)

(52) U.S. Cl.
CPC ............ *F16C 43/04* (2013.01); *B23P 15/003* (2013.01); *F16C 33/58* (2013.01); *F16C 2202/02* (2013.01); *F16C 2240/70* (2013.01); *Y10T 29/49682* (2015.01)

(58) Field of Classification Search
CPC .. B23P 15/003; Y10T 29/49682; F16C 43/04; F16C 2240/70
See application file for complete search history.

(56) References Cited

U.S. PATENT DOCUMENTS

| | | | | |
|---|---|---|---|---|
| 3,577,623 A | * | 5/1971 | Ono | F16C 43/04 29/710 |
| 3,793,697 A | * | 2/1974 | Inque | F16C 43/04 29/714 |
| 9,441,676 B2 | * | 9/2016 | Ito | F16C 33/586 |
| 2003/0067487 A1 | | 4/2003 | Kohls et al. | |
| 2015/0356209 A1 | | 12/2015 | Han et al. | |

FOREIGN PATENT DOCUMENTS

| | | | |
|---|---|---|---|
| CN | 103838932 A | | 6/2014 |
| CN | 104632906 A | | 5/2015 |
| CZ | 201800071 A3 | | 6/2019 |
| JP | 2016056915 A | * | 4/2016 |
| JP | 2017058151 A | | 3/2017 |
| JP | 6520593 B2 | * | 5/2019 |
| RU | 11851 U1 | | 11/1999 |
| RU | 2141582 C1 | | 11/1999 |
| RU | 2626800 C1 | | 8/2017 |
| SU | 1278509 A1 | | 12/1986 |
| SU | 1594305 A1 | | 9/1990 |
| WO | 2015133582 A1 | | 9/2015 |

OTHER PUBLICATIONS

English Translation of Nakayama (Year: 2019).*
English Translation of Kohei et al. (Year: 2016).*
European Search Report for European Application No. 20186984.9-1009 dated Feb. 3, 2021.

* cited by examiner

*Primary Examiner* — Jason L Vaughan

(74) *Attorney, Agent, or Firm* — Lempia Summerfield Katz LLC

(57) ABSTRACT

A method of assembling one or more bearings includes calculating a displacement of an inner ring and an outer ring based on measured geometric properties, mechanical properties, and a predetermined load on the one or more bearings, and pairing inner and outer rings based on the calculated displacement.

17 Claims, 4 Drawing Sheets

METHOD AND APPARATUS OF ASSEMBLING ONE OR MORE BEARINGS

This application claims the benefit of European Patent Application No. EP 20186984.9, filed Jul. 21, 2020, which is hereby incorporated by reference in its entirety.

TECHNICAL FIELD

The present disclosure relates to bearing assemblies and generally to the pairing of components forming an assembly.

BACKGROUND

Bearing assemblies are often used in engines to facilitate rotational movement of engine components. For example, angular contact ball bearings are frequently used in gas turbine engines to support rotating engine components. The bearings include multiple rolling elements contained within a bearing cage. A rolling-element bearing, also known as a rolling bearing, is a bearing that carries a load by placing rolling elements (e.g., balls or rollers) between two bearing rings called races.

A large variety of bearings such as ball radial single-row, Ball radial spherical double-row, Roller radial with short cylindrical rollers, roller radial spherical double-row, roller needle or with long cylindrical rollers, roller radial with spiral rollers, ball radial-thrust single-row, roller tapered, ball thrust, ball thrust-radial, roller thrust, or thrust-radial have become known.

All parts of a bearing are subject to many design constraints. For example, the inner and outer races may possess complex shapes, making the inner and outer races difficult to manufacture. Balls and rollers, though simpler in shape, are small; since they bend sharply where they run on the races, the bearings are prone to fatigue. The loads within a bearing assembly are also affected by the speed of operation: rolling-element bearings may spin over 100,000 rpm. Smaller rolling elements are lighter and thus have less momentum, but smaller elements also bend more sharply where the elements contact the race, causing the elements to fail more rapidly from fatigue.

The bearings are classified into certain precision grades. The tolerances for each grade are found in JIS and ANSI/ABMA. The tolerances may be given in grades and may differ dependent on the diameter of the rings of the bearings. General rules regarding verifying ball bearing dimensions and runout are specified in JIS B 1515-2.

Metric rolling-element bearings have alphanumerical designations, defined by ISO 15, to define all of the physical parameters. The fourth character therein is the accuracy ratings, which normally are, in ascending order: 0 (normal), 6X, 6, 5, 4, T, and 2. Ratings 0 and 6 are the most common; ratings 5 and 4 are used in high-speed applications; and rating 2 is used in gyroscopes.

Patent publication US 20030067487 A1 discloses a component mating characteristics defining method in computer aided design, and involves displaying a window for specifying settings defining mating characteristics of a component constraint interface with respect to others.

Patent publication CN 010098846 discloses a high-bearing ability shaft hole connecting structure designing method, and involves establishing a contact optimization design model, and adjusting a hole contact surface curved surface parameter to increase hole contact area to distribute stress.

Patent publication CN 104632906 A discloses a matching method of negative clearance of separate ring of a conical roller bearing, and involves obtaining a width by subtracting a width value from an obtained standard space.

Patent publication US 20150356209 A1 discloses a CAD geometric modeling system that has an intelligent behavior module executable by a computing device, and for invoking intelligent behaviors to be applied to or associated with components of a matching pair according to intelligent rules.

Patent publication CZ 201800071 discloses a method for performing iterative design of rolling bearing construction by creating a basic bearing model in a CAD modeler, and involves feeding back modification of a bearing to a calculation module based on geometry design and physical parameters.

SUMMARY AND DESCRIPTION

Accuracy of an assembly such as a bearing and a tolerance (e.g., permissible limit or limits of variation in dimension) depends on tolerances of the components used. However, the case may appear that certain types of components or batches of components have a higher tolerance than the assembly. For example, a production tolerance of inner and/or outer rings of the bearing may be 10 µm, whereas the tolerance of the assembly may be only 2 µm. In such a case, suitable components are to be selected (e.g., paired).

The scope of the present invention is defined solely by the appended claims and is not affected to any degree by the statements within this summary.

The present embodiments may obviate one or more of the drawbacks or limitations in the related art. For example, a complete assembly that, for example, under external physical influences, such as preload, adheres to narrower tolerance requirements than the individual components is provided. In other words, for example, where the two or more individual components of the assembly meet respective tolerance requirements, the assembly may meet narrower tolerance requirements.

According to a first aspect, a method of assembling one or more bearings is provided. The method includes the acts of calculating a displacement of an inner ring and an outer ring based on measured geometric properties, mechanical properties, and a predetermined load on the bearing, and pairing inner and outer rings based on the calculated displacement.

According to a second aspect, an apparatus is provided. The apparatus includes a processor and a memory operative to carry out the method acts of the first aspect.

According to a third aspect, a computer program product is provided. The computer program product (e.g., a non-transitory computer-readable storage medium) includes program code (e.g., instructions) that, when executed, performs any one of the method acts of the first aspect.

DETAILED DESCRIPTION

Figure 1:
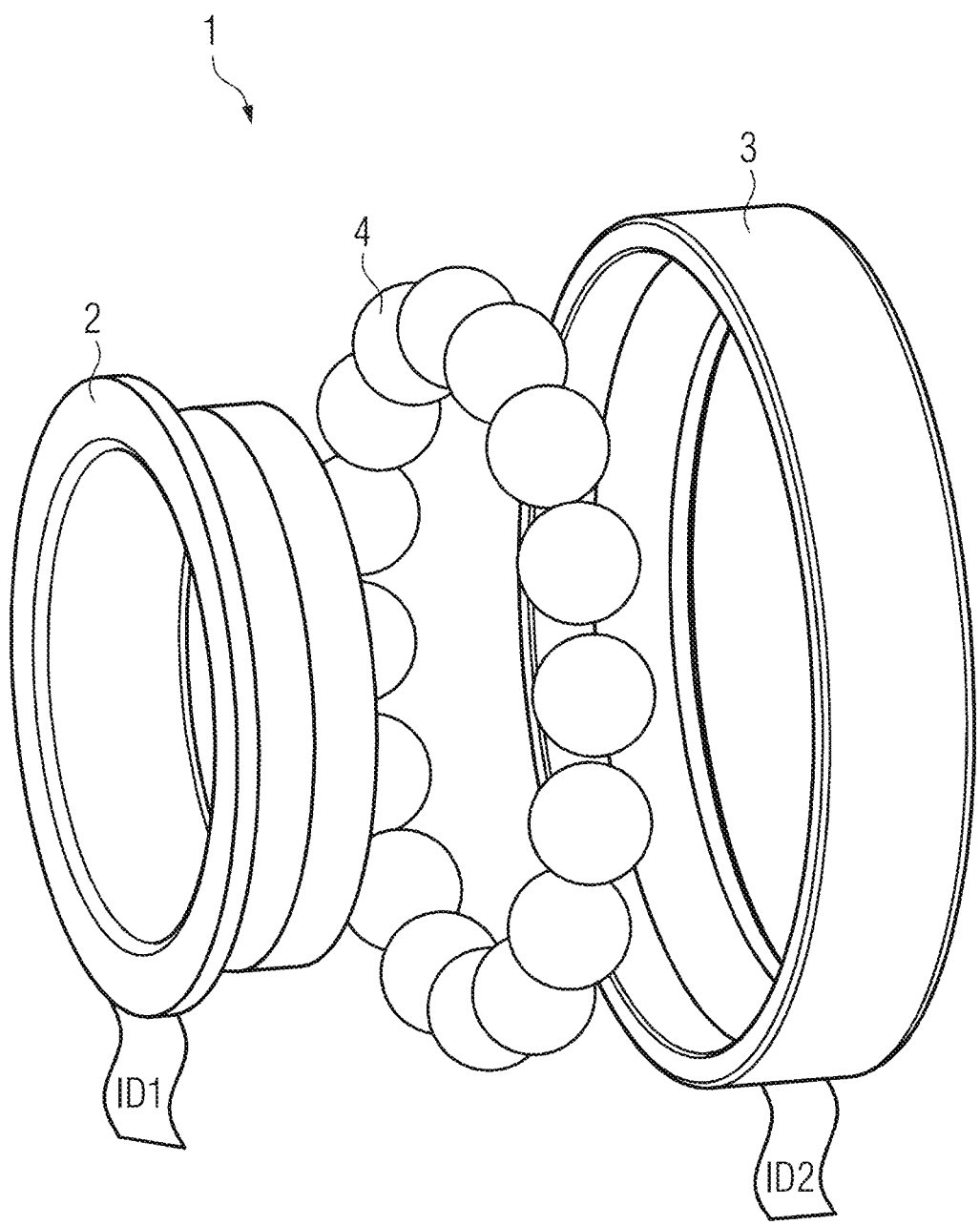
FIG. 1 shows an illustration of a rolling-element bearing.

A rolling-element bearing 1 is illustrated in FIG. 1. The bearing 1 includes an inner ring 2 and an outer ring 3. The bearing 1 may be an angular contact ball bearing. For the production and assembly of high precision bearings 1, inner rings 2 and outer rings 3, as well as rolling elements 4 are to be selected and assembled. The bearing manufacturer receives certain types and/or batches of inner and outer rings 2, 3 (e.g., manufactured according to a certain precision and tolerance). For example, in order to obtain thirty bearings 1 of the desired precision (e.g., low tolerance), the bearing manufacturer may need to assemble 60 bearings. In other words, a certain number of components 2, 3, 4 may be assembled to yield a bearing 1 of the desired precision, but the majority of components 2, 3, 4 are to be reprocessed (e.g., grinded) in order to yield the tolerance desired.

The purpose of applying preload to a bearing 1 is to improve the runout precision of the rotating axis, and to reduce vibration and noise. It is important to select the proper amount of preload and method for each application. Otherwise, bearing 1 performance such as life, noise, and vibration will be degraded. Excessive heat may be generated also.

For example, when a ball bearing 1 is used in a motor, vibration levels will increase, balls will move more, and the stiffness of the ball bearing will be very low if there is any radial clearance. Therefore, internal clearance is to be adjusted by applying an axial load. This load applied in the axial direction is referred to as the "preload" and serves for reducing vibration and noise.

Appropriate preload may be applied individually for each ball bearing size. If the preload is applied excessively, the bearing 1 stiffness will increase. However, bearing life will be shorter, and bearing noise will increase as well. If the applied preload is insufficient, fretting corrosion may occur due to vibration and low bearing stiffness. Therefore, applying the correct preload is very important.

Figure 2:
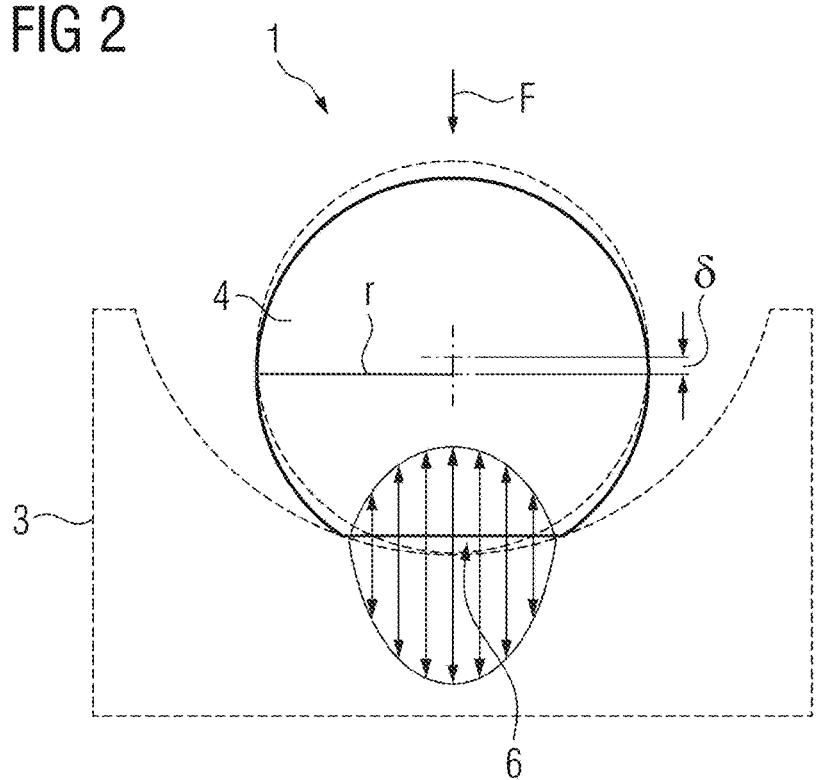
FIG. 2 illustrates contact mechanics between a sphere an a hollow-sphere.

When the preload F is applied to the rolling element bearing 1, a contact ellipse is generated as a result of elastic deformation of the contact areas between balls 4 and raceways, as, for example, shown in FIG. 2. The surface stress is given by dividing the load F, which is generated in the perpendicular direction at the contacts between balls 4 and raceways 6, by the surface areas of the contact ellipses. There are two basic methods of preloading: solid preload and spring preload. Solid preload may be obtained by mechanically locking all of the rings in position. The advantages of this type of design are simplicity and high stiffness. However, expansion and shrinkage of the components due to temperature change occasionally may cause changes in preload. The components may also wear out, and eventually the preloads may be reduced. Spring Preload (e.g., Constant pressure preload) may be applied by using a coil spring, a spring wave washer, and so on. An advantage of spring preload is a stable preload despite temperature variation.

When the load F are applied to the bearing 1, the displacement S takes place at the contact points between balls and raceways. In addition to radial displacement, axial displacement S may take place. The initial contact angle of the bearing 1, which had an initial clearance that was eliminated by moving the raceway rings 2, 3 in the axial directions, may be calculated, and vice versa. The geometric and material-specific dependencies on each other are complex and may only be solved by combining several algorithms.

Components such as inner and outer rings 2, 3 of a bearing 1 may be manufactured according to specific tolerances, as mentioned in the above (e.g., a type or batch of inner and/or outer ring 2, 3 may be fabricated according to a specific tolerance). Thus, a type or batch of a component 2, 3, 4 includes a plurality of components manufactured according to a specific tolerance. For example, for a set of twenty inner rings and thirty outer rings, six hundred pairings (e.g., combinations) are in principle possible.

Matching and pairing the individual components 2, 3, 4 may be done by assembling a component combination by measuring the distances (e.g., between the components) under external physical influences (e.g., load, sorting the components according to one or more tolerance criteria (within/outside the required/desired tolerance), and, if necessary, determining the size and location of the corrections to the combination of components in order to create an assembly within the tolerance).

Material-specific data, geometry data, and external influencing variables may be collected (e.g., by a user entering the data via a user interface). Geometric measurement data of the inner and/or outer rings 2, 3 may automatically be obtained from a database (e.g., a machine-readable database). The geometric measurement data may be used in order to determine all possible pairings or a subset of possible pairings of inner and outer rings, 2, 3. To that end, the inner and/or outer rings 2, 3 (e.g., all of the inner and/or outer rings 2, 3) are measured. For example, the coordinates of the individual components 2, 3 may be measured (e.g., by a coordinate measuring machine (CMM) that measures the geometry of physical objects by sensing discrete points on the surface of the object with a probe). Now, in order to identify the individual components, such as the inner and outer rings 2, 3, each component may be labeled in order to assign an identifier in the database to each of the components. For example, the components may be equipped with a tag id1, id2, such as a bracelet, as shown in FIG. 1. The tag may include a barcode or RFID-chip.

The possible pairings (e.g., totality of possible pairings; of inner and outer rings 2, 3) may be filtered in order to identify geometrically identical pairings (e.g., duplicates). For example, geometrically identical pairings may be pairings that have identical dimensions (e.g., raceway radius and/or the distance between the raceway and a front side or back side of the inner and outer ring). Identical may be indiscernible above a certain threshold (e.g., above 1 µm).

Figure 5:
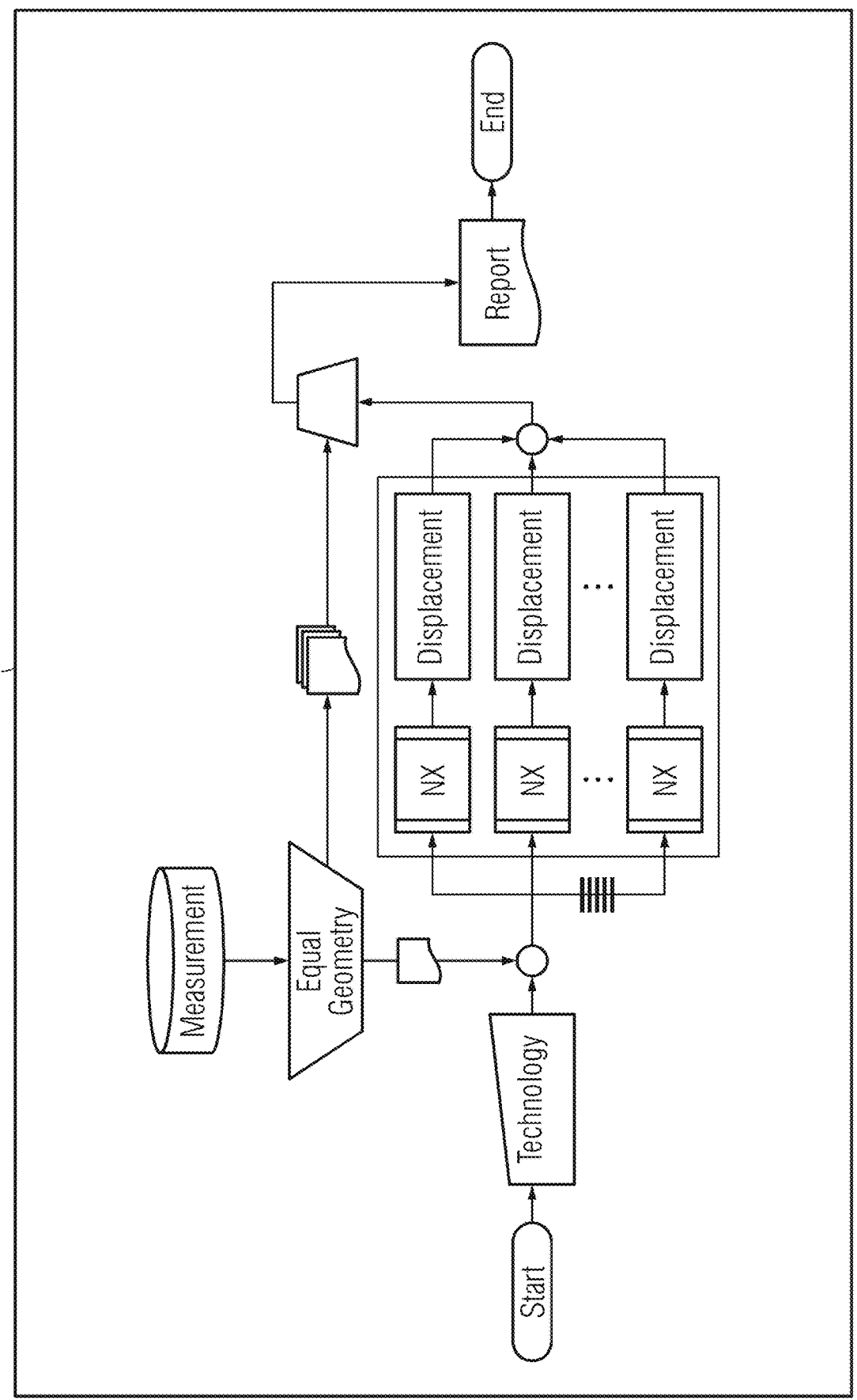
FIG. 5 illustrates an exemplary program flow including one or more method acts according to an embodiment.

The geometry data of the filtered pairings may then be transferred to a model that may be part of a CAD software application, as shown in FIG. 5. The model may be a model of the individual component such as the inner ring 2, the outer ring 3, the rolling element 4, and/or the bearing 1 as a whole. The model may include the nominal values of the component's dimension. The nominal values of the components may correspond to the manufacturer's specification.

From this model, distances as well as other geometric data, which is used for the calculation of displacement S due to external influences, such as a load, is determined. By way of the material-specific, geometric, and/or mechanical properties, formulas (cf., below) describing the displacement S of the assembly under external influence may be filled and calculated. The calculation is performed based on the measured distances. A pairing of components is then performed based on the calculation and the pairing may be categorized based on the tolerated distance. This is achieved by calculating for all possible pairings the resulting displacement based on the geometric data measured. After all possible pairings have gone through the calculation, the pairings are ordered in accordance with the respective distance and the permissible tolerance. Finally, an output (e.g., digital output) of the paired components may be generated, which is also shown in FIG. 5.

FIG. 2 shows the contact mechanics between a sphere and a hollow sphere. Further details of the calculation of the displacement and the assumptions made will be described in the following. The contact in the case of bearings is often a contact between a convex surface (e.g., male cylinder or sphere) and a concave surface (e.g., female cylinder or sphere: bore or hemispherical cup). In this case, the sphere may correspond to the rolling element 4 of the bearing, and the hollow sphere or halfsphere may correspond to the outer or inner ring 2, 3 of the bearing.

It may be idealized that no tension force is allowed to occur within the contact area (e.g., contacting bodies may be separated without adhesion forces). The following assumptions are made in determining the solutions of Hertzian contact problems: The strains are small and within the elastic limit. The surfaces are continuous and non-conforming (e.g., implying that the area of contact is much smaller than the characteristic dimensions of the contacting bodies). Each body may be considered an elastic half-space. The surfaces are frictionless.

Hence, the displacement S between two bodies according to Hertz may be obtained by the following formula:

$$\delta = \frac{\alpha^2}{r}$$

$\alpha$ is the radius of the contact area, r is the radius of the sphere (e.g., rolling element, such as ball) that, in the special case of a contact between a sphere and a hollow sphere, becomes:

$$\alpha = \sqrt[3]{\frac{1.5(1-\mu^2) \cdot F \cdot r}{E}}$$

where $\mu$ is the lateral-contraction coefficient, F is the load, E is the combined elastic module of the two spheres (e.g., sphere and hollow sphere), and 1,5 is a numerical constant.

Figure 3:
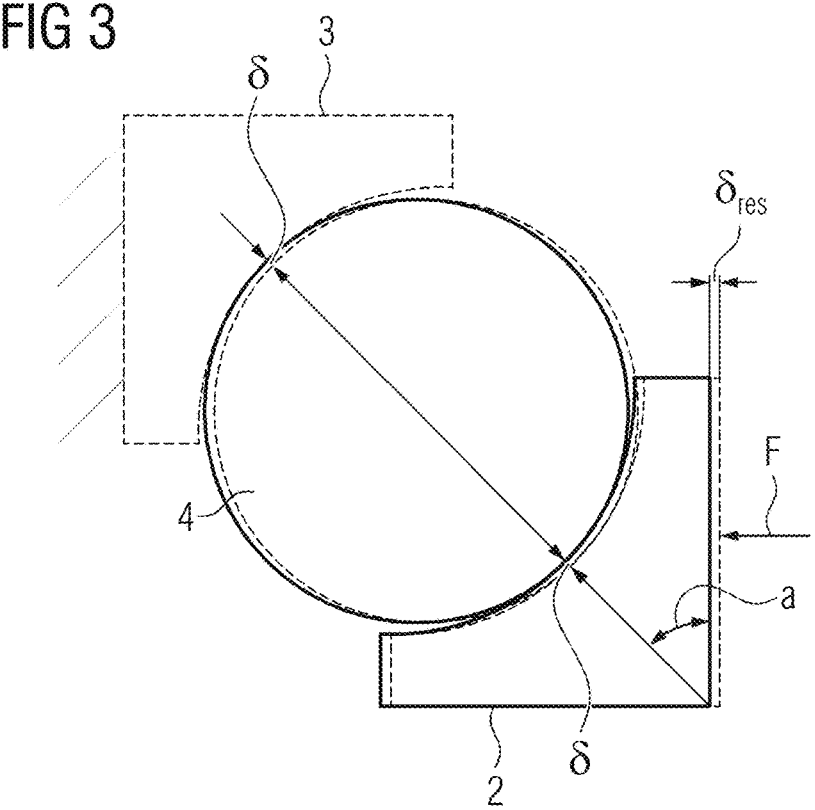
FIG. 3 illustrates a displacement of an angular contact ball bearing under load.

Now turning to FIG. 3, displacement of an angular contact ball bearing, including inner and outer ring 2, 3 and rolling element 4, under load F is illustrated.

Here, the axial displacement $\delta_{res}$ is calculated according to:

$$\delta_{res} = \sin(\alpha) \left(\frac{r_1 \cdot r_2}{r_1 + r_2}\right)^{-1} \left(\frac{\frac{3}{2}(1-\mu^2) \cdot F \cdot \left(\frac{r_1 \cdot r_2}{r_1 + r_2}\right)}{E}\right)^{\frac{2}{3}}$$

where r2 is the radius of the rolling element (e.g., ball), and r1 is the radius of the raceway. As already mentioned, the radius of the inner and outer ring 2, 3 may be measured. The resulting displacement $\delta_{res}$ (e.g., axial displacement) of a load of F=2N (e.g., per rolling element) then amounts to:

$\delta_{res}$=5,3*10$^{-4}$ mm given that $$E = 210000 \frac{N}{mm^2} \text{ and } r_1 = 3.27 \text{ mm}, r_2 = 3.175 \text{ mm}, \text{ and } \mu = 0.3.$$

Figure 4:
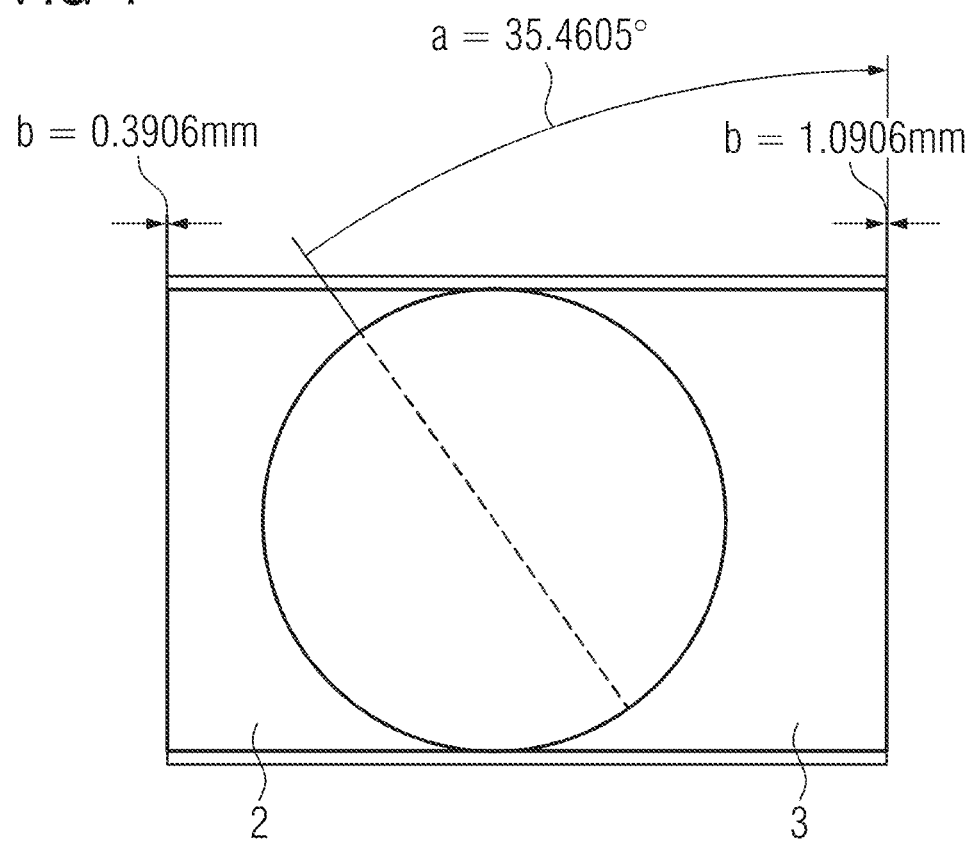
FIG. 4 illustrates a contact angle of a bearing.

Now turning to FIG. 4, the contact angle a resulting from the two contact points of the ball and the inner or outer ring 2, 3 is illustrated. The values given are without load F (e.g., F=0) and purely due to the geometry given by the measured values of the inner and outer rings 2, 3. The deformation of the inner and outer ring is not considered for the axial displacement in the present case. The resulting displacement S according to FIG. 4 is calculated without considering the load on the bearing but taking into account the measured dimensions of the inner and outer ring 2, 3. Axial distance b is shown in FIG. 4, resulting from the variability of the tolerances of the inner ring, the outer ring 2, 3, and the ball (e.g., the geometric properties of the components).

The dimensions of the rolling element may be taken from the specification of the manufacture since usually the tolerance of the rolling element 4 is smaller than the tolerance for the inner rings and/or outer rings 2, 3. Further, the rolling elements 4 may have a higher mechanical stiffness than a material of the inner and outer rings.

Turning to FIG. 5, exemplary method acts are shown. The method acts may be executed by an apparatus 5 including a processor and a memory, not shown. A software application may be started for retrieving input from a user and/or from one or more databases. The data retrieved may include data relating to the material properties of the inner and/or outer bearing and/or the rolling element. Further, data relating to the measurement of the individual components may be retrieved. In addition, the components having identical geometry may be filtered out and thus excluded from further processing in order to save processing time and power. Now, for each possible combination of components, the contact angel and the displacement without load may be determined based on a CAD application. Exemplary SIEMENS NX CAD software is shown in FIG. 5. For example, the nominal values in the CAD application may be replaced by the values of the geometry of the component(s) as measured. Subsequently, the displacement may be calculated as described in connection with FIGS. 2 and 3 in the above. Then, the results are compared with the tolerance for the assembly as required. In case two or more components meet the required tolerance, the components may be paired, and the result may be output in the form of a report. For example, the components may be numbered individually. The report may then include a list of components to be paired (e.g., component 25 (e.g., inner ring) and component 17 (e.g., outer ring). The components with identical geometries (e.g., duplicates) may now be used in the pairing of components as the calculation has been performed for those components already. The software application may then exit with or without storing the report and the respective pairings.

By way of the method and system, proposed costs and time may be saved due to the measurement of components of the assembly and the automatic virtual assembly. This minimizes the rate of rework and scrap. In a single software application, all possible component combinations are automatically checked, and the necessary revision is determined. Hence, by way of the disclosure herein, manual activities in the assembly process are significantly reduced. The disclosure encompasses the combination of a CAD application (Siemens NX) with a software application that comprises formulas describing material behavior, where the dimensions of the components have been actually measured.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of assembling one or more bearings, the method comprising:
   obtaining geometric measurement data of inner rings, outer rings, or the inner rings and the outer rings from a database;
   determining all possible pairings of the inner rings and the outer rings based on the geometric measurement data;
   transferring the geometric measurement data of the possible pairings to a model of the one or more bearings, the model being part of a computer-aided design (CAD) software application;
   calculating, from the model, a displacement of an inner ring of the inner rings and an outer ring of the outer rings for all the possible pairings based on the geometric measurement data, mechanical properties, and a predetermined load on the one or more bearings; and
   pairing the inner ring and the outer ring based on the calculated displacement, such that bearing assemblies are formed.

2. The method of claim 1, further comprising assembling the one or more bearings based on the pairing of the inner and outer rings.

3. The method of claim 1, further comprising pairing the inner and outer rings when the calculated displacement does not exceed a predetermined threshold.

4. The method of claim 3, wherein the predetermined threshold is based on a tolerance required for an assembly of the one or more bearings.

5. The method of claim 1, further comprising measuring, for a plurality of inner and outer rings, one or more geometric properties.

6. The method of claim 5, wherein the one or more geometric properties comprise raceway radius, a distance between a raceway and a front side or a back side of the inner ring and the outer ring, respectively, or the raceway radius and the distance.

7. The method of claim 1, further comprising determining one or more mechanical properties of a material of the inner ring and the outer ring.

8. The method of claim 7, wherein the one or more mechanical properties comprise mechanical stiffness.

9. The method of claim 1, further comprising determining a contact stress of the bearing assembled based on a predetermined load of the bearing when assembled, when in use, or when assembled and when in use.

10. The method of claim 1, further comprising:
    receiving nominal values of the geometric properties of the inner ring and the outer ring; and
    replacing the nominal values of the geometric properties with the measured values of the geometric properties of the inner ring and the outer ring.

11. The method of claim 1, further comprising:
    determining one or more geometric properties of one or more rolling elements of the bearing;
    determining one or more mechanical properties of the one or more rolling elements of the bearing; and
    determining a displacement of the inner ring and the outer ring of the bearing caused by load on the bearing via the one or more rolling elements.

12. The method of claim 11, wherein a material of the one or more rolling elements has a higher mechanical stiffness than a material of the inner ring and the outer ring.

13. The method of claim 1, further comprising:
    assigning an identifier to each of the inner ring and the outer ring; and
    pairing the inner ring and the outer ring using the assigned identifier.

14. The method of claim 1, wherein the inner ring and the outer ring possess a manufacturing tolerance larger than a tolerance required for an assembly of the one or more bearings.

15. The method of claim 1, further comprising:
    pairing the inner ring and the outer ring when the calculated displacement exceeds a predetermined threshold; and
    providing processing information for assembling a specific pair of the inner ring and the outer ring.

16. An apparatus comprising:
    a memory; and
    a processor in communication with the memory, the processor being configured to:
      obtain geometric measurement data of inner rings, outer rings, or the inner rings and the outer rings from a database;
      determine all possible pairings of the inner rings and the outer rings based on the geometric measurement data;
      transfer the geometric measurement data of the possible pairings to a model of one or more bearings, the model being part of a computer-aided design (CAD) software application;
      calculate, from the model, a displacement of an inner ring of the inner rings and an outer ring of the outer rings of the one or more bearings for all the possible pairings based on the geometric measurement data, mechanical properties, and a predetermined load on the one or more bearings; and
      pair the inner ring and the outer ring based on the calculated displacement, such that bearing assemblies are formed.

17. In a non-transitory computer-readable storage medium that stores instructions executable by one or more processors to assemble one or more bearings, the instructions comprising:
    obtaining geometric measurement data of inner rings, outer rings, or the inner rings and the outer rings from a database;
    determining all possible pairings of the inner rings and the outer rings based on the geometric measurement data;
    transferring the geometric measurement data of the possible pairings to a model of the one or more bearings, the model being part of a computer-aided design (CAD) software application;
    calculating, from the model, a displacement of an inner ring of the inner rings and an outer ring of the outer rings for all the possible pairings based on the geometric measurement data, mechanical properties, and a predetermined load on the one or more bearings; and
    pairing the inner ring and the outer ring based on the calculated displacement, such that bearing assemblies are formed.

* * * * *